United States Patent
Petri et al.

(10) Patent No.: US 10,527,176 B2
(45) Date of Patent: Jan. 7, 2020

(54) SEAT VALVE WITH ELECTROMAGNETIC ACTUATION

(71) Applicant: Thomas Magnete GmbH, Herdorf (DE)

(72) Inventors: Wolfgang Petri, Neunkirchen (DE); Stefan Pilz, Neunkirchen (DE); Thomas Lütz, Siegen (DE); Marco Jung, Langenbach (DE); Willi Schäfer, Neunkhausen (DE); Julia Bieler, Siegen (DE)

(73) Assignee: Thomas Magnete GmbH, Herdorf (DE)

( * ) Notice: Subject to any disclaimer, the term of this patent is extended or adjusted under 35 U.S.C. 154(b) by 0 days.

(21) Appl. No.: 15/700,633

(22) Filed: Sep. 11, 2017

(65) Prior Publication Data
US 2018/0073651 A1    Mar. 15, 2018

(30) Foreign Application Priority Data
Sep. 12, 2016    (DE) .......................... 10 2016 011 059

(51) Int. Cl.
*F16K 1/36* (2006.01)
*F16K 31/06* (2006.01)

(52) U.S. Cl.
CPC ............ *F16K 1/36* (2013.01); *F16K 31/0658* (2013.01); *F16K 31/0665* (2013.01)

(58) Field of Classification Search
CPC .... F16K 31/0665; F16K 31/0658; F16K 1/36; F16K 47/02
See application file for complete search history.

(56) References Cited

U.S. PATENT DOCUMENTS

| 3,294,120 A | 12/1966 | Ruchser | |
| 3,433,264 A * | 3/1969 | Parkison | F16K 11/0787 137/625.17 |

(Continued)

FOREIGN PATENT DOCUMENTS

| CH | 448655 A | 12/1967 |
| DE | 2951462 A1 | 7/1980 |

(Continued)

OTHER PUBLICATIONS

German Office Action dated Aug. 7, 2017 in corresponding/related German Application No. 10 2016 011 058.9.
U.S. Appl. No. 15/700,596, filed Sep. 11, 2017, Petri et al.

*Primary Examiner* — Umashankar Venkatesan
(74) *Attorney, Agent, or Firm* — Harness, Dickey & Pierce, P.L.C.

(57) ABSTRACT

A seat valve with electromagnetic actuation having switching noises during closure of the seat valve should be noticeably reduced independently of a temperature of a fluid in the seat valve, without considerably increasing the production costs of the seat valve. A sealing body of the seat valve is produced from a plastic which is selected from the group (PEEK, PEI, PASU and LCP), and the flow of force for fastening and for transmitting structure-borne sound from a sealing seat to a fastening surface has at least one transition from a metallic component to a component composed of plastic and a transition from the component composed of plastic to a fastening surface of some other metallic component. The seat valve may be used in hydraulic brake systems of vehicles, but also in gear mechanisms or hydraulic systems.

4 Claims, 2 Drawing Sheets

(56) References Cited

U.S. PATENT DOCUMENTS

| | | | |
|---|---|---|---|
| 3,576,199 A * | 4/1971 | Schoepe | E03D 1/30 |
| | | | 137/414 |
| 3,945,055 A * | 3/1976 | Hollars | E03D 1/01 |
| | | | 4/359 |
| 5,128,085 A * | 7/1992 | Post | B60B 7/00 |
| | | | 264/254 |
| 6,131,606 A | 10/2000 | O'Neill | |
| 8,960,639 B2 | 2/2015 | Hilzendegen et al. | |
| 2005/0001190 A1 * | 1/2005 | Shirase | B60T 8/363 |
| | | | 251/129.15 |
| 2015/0260302 A1 | 9/2015 | Peterson et al. | |
| 2017/0307101 A1 * | 10/2017 | Ambrosi | B60T 13/686 |

FOREIGN PATENT DOCUMENTS

| | | |
|---|---|---|
| DE | 19753575 A1 | 6/1999 |
| DE | 102012106684 A1 | 1/2014 |
| DE | 102014217447 A1 | 3/2016 |
| EP | 2491231 B1 | 8/2014 |

\* cited by examiner

SEAT VALVE WITH ELECTROMAGNETIC ACTUATION

CROSS-REFERENCE TO RELATED APPLICATIONS

This application claims benefit of German Application No. 10 2016 011 059.7 filed on Sep. 12, 2016. The entire disclosure of the above application is incorporated herein by reference.

FIELD

The present disclosure relates to a seat valve.

BACKGROUND

This section provides background information related to the present disclosure which is not necessarily prior art.

Seat valves are known in the application areas of hydraulics, pneumatics and process technology and are widely used. Seat valves which are actuated by an electromagnet are also known. In this case, both seat valves which close due to the force of the electromagnet and seat valves which open due to the force of the electromagnet are known. The respective resetting of the seat valve for the de-energized state of the electromagnet is normally brought about by a spring, but designs are also known in which the resetting is brought about by the pressure difference of the connected fluid flows.

During the closure of the seat valve, disturbing switching noises can occur, especially if the closing process is aided by a pressure difference of the connected fluid flows. It is known to reduce the switching noises by throttling of the fluid flows in question or by braking of the electromagnet, but these measures have a very limited effect in a wide temperature range for the use of the seat valve.

SUMMARY

This section provides a general summary of the disclosure, and is not a comprehensive disclosure of its full scope or all of its features.

The switching noises during closure of the seat valve should be noticeably reduced independently of the temperature of the fluid in the seat valve, without considerably increasing the production costs of the seat valve.

The most significant switching noises occur when the sealing body of the seat valve strikes against the sealing seat. If both components are composed of metal, structure-borne sound is transmitted through the other components of the seat valve and to the further components which are mechanically connected to said seat valve. At the large surfaces of said further components, the structure-borne sound then generates airborne sound, which is perceived by persons in the vicinity.

The reduction of the transmitted switching noise is achieved by way of two measures which advantageously complement one another.

Firstly, the sealing body of the seat valve is produced from a plastic which has a considerably lower modulus of elasticity and considerably higher damping than the types of metal suitable for this purpose. Consequently, less structure-borne sound is introduced into the steel components of the seat valve.

Secondly, the construction of the seat valve has the effect that the structure-borne sound has to overcome two boundaries between materials having very different moduli of elasticity on the path to the further components outside the seat valve and is significantly damped during each boundary crossover. This is achieved in that the injection-moulded encapsulation and the fastening flange of the seat valve are produced from a thermoplastic, so that the structure-borne sound firstly passes over from the valve sleeve and other components composed of steel to the thermoplastic of the flange, and from there passes over to the fastening surface for the seat valve. Glass-fibre-reinforced PA6 or PA6.6, for example, is used as the thermoplastic.

Both measures complement one another advantageously because the sound spectrum which, during an impact, is emitted from the pair of materials of the sealing body and of the sealing seat is well damped by the thermoplastic of the injection-moulded encapsulation and of the flange. One measure alone could not damp the switching noises nearly as well.

The teaching described for reducing the switching noises can be applied to both electromagnetically-closing and electromagnetically-opening seat valves, and also to seat valves which are opened by a pressure difference.

The material for the sealing body has to be highly wear-resistant, media-resistant and temperature-resistant, and thus only a small number of plastic materials are suitable. It has been possible to determine by way of tests and from the literature that the materials PEEK: polyetheretherketone
PEI: polyetherimide
PESU: polyethersulfone
LCP: liquid crystal polymer are suitable for this application. The selection between said materials is advantageously made according to the processing conditions and the total costs for the seat valve.

The valve is advantageously designed as an installation valve, which is inserted into an installation bore and is fastened by way of a flange to a fastening surface. Arranged between the fluid ports, indicated here by P and TN, is a seal which prevents a short circuit through the gap between the installation bore and the valve sleeve.

Here, said seal is advantageously designed as a lip seal. It seals a positive pressure difference between P and TN on account of its installation position, but in the case of a negative pressure difference between P and TN, it allows a small fluid flow to pass between the lip of the seal and the installation bore. If this happens infrequently and at a small pressure difference, this does not compromise the lifetime of the seal.

One application of the seat valve according to the disclosure is in a hydraulic brake system of a vehicle, but the technical teaching of this disclosure may also be applied to seat valves in gear mechanisms or in hydraulic systems.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
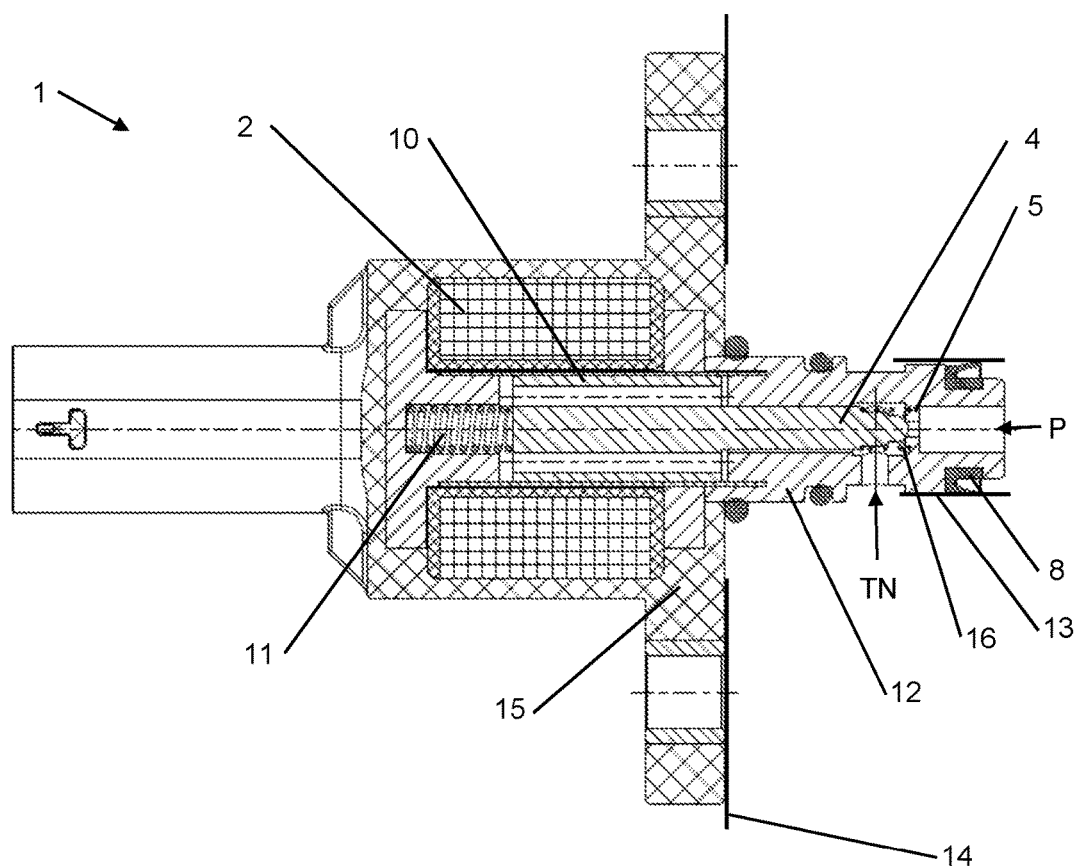
FIG. 1 shows a seat valve having the disclosed features, which opens by means of an electromagnetic force or a pressure difference.
Figure 2:
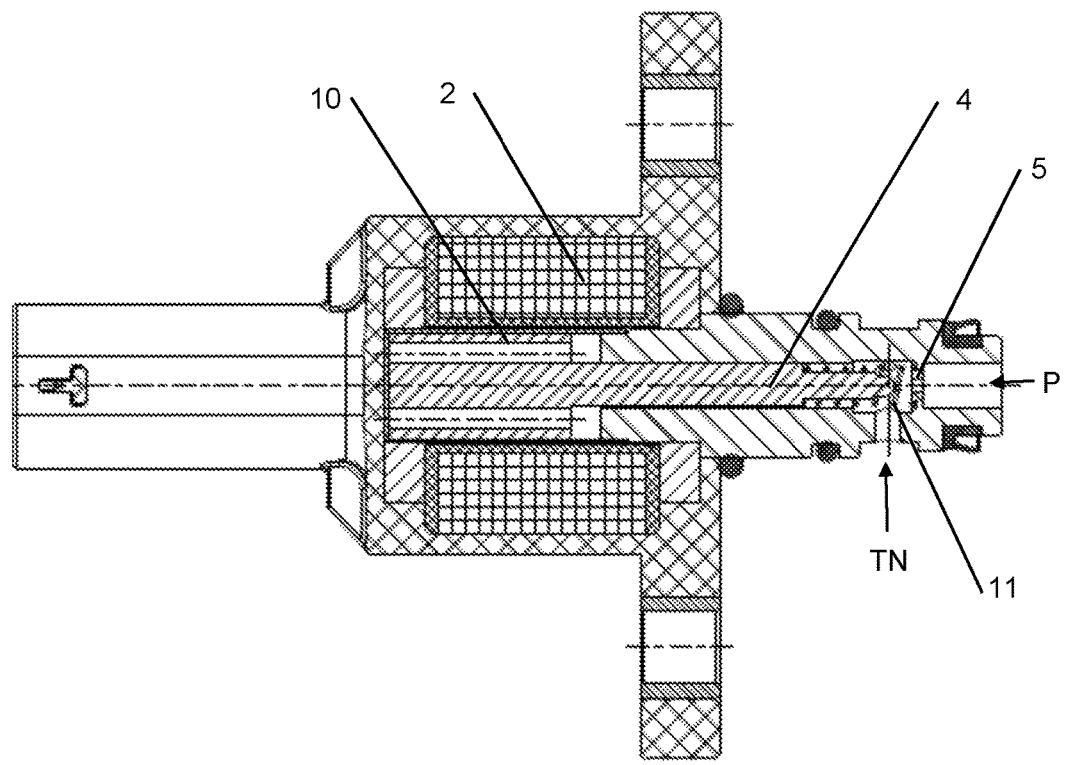
FIG. 2 shows a seat valve having the disclosed features, which closes by means of an electromagnetic force.

A seat valve 1 according to FIG. 1 or FIG. 2 is actuated by an electromagnet 2 and has a valve sleeve 12 with a sealing seat 5, has a sealing body 4 which is connected in a force-fitting manner to an armature 10 of the electromagnet 2, and has two ports, namely the ports P and TN, for fluid flows.

Closure of the fluidic connection from P to TN is realized by the placement of the sealing body 4 against the sealing seat 5.

The sealing body 4 is produced from a plastic which is selected from the group (PEEK, PEI, PASU and LCP).

The unavoidable flow of force for transmitting structure-borne sound from the sealing seat 5 to a fastening surface 14 has at least one transition from a metallic component to a component 15 composed of plastic and a transition from the component 15 composed of plastic to some other metallic component, for example to a fastening surface 14 of a device.

In a first embodiment of the seat valve according to FIG. 1, in the de-energized state of the electromagnet 2, a fluid flow from P to TN occurs only if the pressure difference between the ports P and TN exceeds a limit value of $\Delta p_G$, because the force of the specified pressure difference overcomes the sum of the forces of springs 11, 16, and because in this case the sealing body 4 is pushed out of its sealing seat 5, wherein in the de-energized state of the electromagnet 2, no fluid flow from P to TN occurs if the specified pressure difference is less than $\Delta p_G$, because then the sealing body 4 remains in its sealing seat 5.

In this embodiment, in the energized state of the electromagnet 2, a fluid flow from P to TN occurs even in the case of a pressure difference less than $\Delta p_G$, because the sum of the forces of the electromagnet 2 and of the specified pressure difference overcomes the force of the springs 11, 16, wherein the sum of the forces pushes the sealing body 4 out of the sealing seat 5, wherein the fluidic connection between the ports P and TN is opened.

In a second embodiment of the seat valve according to FIG. 2, in a de-energized state of the electromagnet 2, the spring 11 pushes the sealing body 4 out of the sealing seat 5, while in an energized state of the electromagnet, the force of the electromagnet 2 overcomes the forces of the spring 11 and of the pressure difference between the ports P and TN and pushes the sealing body 4 into the sealing seat 5, wherein the fluidic connection between the ports P and TN is closed.

In an advantageous embodiment of the seat valve, between the ports P and TN, a static seal 8, which is produced from an elastomer material and which is designed as a lip seal, is arranged in an outer groove of the valve sleeve 12.

If the pressure at the port P is greater than or equal to the pressure at the port TN, the sealing lip of the seal bears against an installation bore 13, wherein, if the pressure at the port TN exceeds the pressure at the port P, the seal 8 loses its sealing function and opens up a fluid flow from the port TN to the port P because the sealing lip is lifted off from the installation bore.

LIST OF REFERENCE SIGNS

1. Seat valve
2. Electromagnet
4. Sealing body
5. Sealing seat
8. Seal
10. Armature
11. Spring
12. Valve sleeve
13. Installation bore
14. Fastening surface
15. Component composed of plastic
16. Second spring
P First port for fluid flow
TN Second port for fluid flow
I1 Limit value for the electric current
$\Delta p_G$ Limit value for the pressure difference The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat valve actuated by an electromagnet has a valve sleeve with a sealing seat, has a sealing body connected in a force-fitting manner to an armature of the electromagnet, and has two ports, namely the ports P and TN, for fluid flows, wherein closure of a fluidic connection of the ports P to TN is realized by the placement of the sealing body against the sealing seat,
    wherein the sealing body is produced from a plastic which is selected from the group (PEEK, PEI, PASU and LCP),
    and in that a fastening structure that transmits structure-borne sound from the sealing seat to a fastening surface has at least one transition from a metallic component to a component composed of plastic and a transition from the component composed of plastic to the fastening surface of some other metallic component,
    wherein between the ports P and TN, a static seal, which is produced from an elastomer material and which is designed as a lip seal, is arranged in an outer groove of a valve sleeve, and, if a pressure at the port P is not less than a pressure at the port TN, the sealing lip of said static seal bears against an installation bore, wherein the seal loses its sealing function if the pressure at the port TN exceeds the pressure at the port P, because the sealing lip of the seal is lifted off from the installation bore, wherein the seal opens up a fluid flow from the port TN to the port P.

2. The seat valve according to claim 1, wherein in a de-energized state of the electromagnet, a fluid flow from P to TN occurs only if a pressure difference between the ports P and TN exceeds a limit value of $\Delta p_G$, because a pressure force of the pressure difference overcomes a spring force of at least one spring, and because in this case the sealing body is pushed out of the first sealing seat by the pressure force, wherein in the de-energized state of the electromagnet, no fluid flow from P to TN occurs if the specified pressure difference is less than $\Delta p_G$, and in that in the energized state of the electromagnet, a fluid flow from P to TN occurs even in the case of a pressure difference less than $\Delta p_G$, because a sum of the forces of the electromagnet and of the specified pressure difference between the ports P and TN overcomes the spring force of the at least one spring, wherein the sum of the forces pushes the sealing body out of the sealing seat.

3. The seat valve according to claim 1, wherein in a de-energized state of the electromagnet, at least one spring pushes the sealing body out of the sealing seat, and in that in an energized state of the electromagnet, a force of the electromagnet overcomes a spring force of the at least one spring and of the pressure difference between the ports P and TN and pushes the sealing body into the sealing seat.

4. A seat valve comprising:

an electromagnet having an armature configured to actuate the seat valve;

a valve sleeve having a sealing seat and a sealing body connected to the armature;

a first fluid port P;

a second fluid port TN;

wherein closure of a fluidic connection between the first fluid port P to the second fluid port TN occurs upon positioning of the sealing body against the sealing seat;

wherein the sealing body is produced from a plastic which is selected from the group (PEEK, PEI, PASU, and LCP);

wherein a fastening structure that transmits structure-borne sound from the sealing seat to a fastening surface has at least one transition from a metallic component to a dampening component composed of plastic and a transition from the dampening component composed of plastic to the fastening surface of some other metallic component; and wherein between the ports P and TN, a static seal, which is produced from an elastomer material and which is designed as a lip seal, is arranged in an outer groove of the valve sleeve, and, if a pressure at the port P is not less than a pressure at the port TN, the sealing lip of said static seal bears against an installation bore, wherein the seal loses its sealing function if the pressure at the port TN exceeds the pressure at the port P, because the sealing lip of the seal is lifted off from the installation bore, wherein the seal opens up a fluid flow from the port TN to the port P.

* * * * *